Oct. 6, 1959    E. W. CLARK    2,907,951
FREQUENCY MEASURING APPARATUS
Filed March 13, 1956    2 Sheets-Sheet 1

Inventor:
Earl W. Clark
by, Richard E. Horley
His Attorney

Oct. 6, 1959 E. W. CLARK 2,907,951
FREQUENCY MEASURING APPARATUS
Filed March 13, 1956 2 Sheets-Sheet 2

Inventor:
Earl W. Clark
by, Richard E. Haley
His Attorney

United States Patent Office 2,907,951
Patented Oct. 6, 1959

2,907,951

FREQUENCY MEASURING APPARATUS

Earl W. Clark, East Lynn, Mass., assignor to General Electric Company, a corporation of New York Application March 13, 1956, Serial No. 571,329

6 Claims. (Cl. 324—81)

This invention relates generally to frequency measuring apparatus and more particularly to improvements in that class of frequency measuring apparatus utilizing a pair of parallel tuned circuits as an integral part thereof.

In one form of such apparatus intended to measure variations in frequency above and below 60 cycles, an instrument mechanism has been proposed having a pair of field windings of opposite polarity arranged on a suitable magnetic frame such that the fluxes produced thereby produce opposite deflection of a current carrying armature winding conveniently arranged around a magnetic core separated from the frame by a suitable airgap. Each field winding has an inductance and a condenser in series therewith and the two circuits thus formed are connected in series with the armature winding across the terminals of the instrument. Both of the parallel circuits are tuned, one being tuned to a frequency above 60 cycles and the other being tuned to a frequency below 60 cycles.

By this arrangement, the armature tends to deflect in one direction when current is flowing through one field winding and tends to deflect in the opposite direction when current is flowing through the other field winding. Since current is flowing through both field windings at all times, the net deflection of the armature depends upon the relationship between the currents in the field windings. The constants of the circuits are such that the field coil currents are equal at 60 cycles, so that the deflecting torque is zero. Hence, a conventional control spring is used to hold the armature in this position, and the 60 cycle mark on the indicating scale associated with the armature is placed at the mid-point thereof.

With frequencies above 60 cycles, the currents in the tuned circuits will be unequal in one sense and the armature will deflect upscale. With frequencies below 60 cycles, the currents in the tuned circuits will be unequal in the opposite sense and the armature will deflect downscale.

Figure 4:
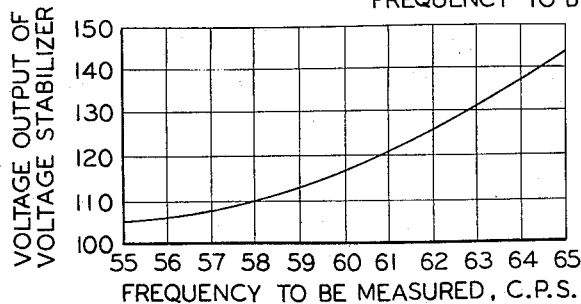

A typical example of the aforementioned type of frequency measuring apparatus is shown in Figure 4 of U.S. Patent 2,133,150, issued on October 11, 1938, to Rich, and assigned to the same assignee to which the subject application is assigned, and, in general, such apparatus is quite satisfactory for measuring frequency when the variation in frequency is not expected to exceed more than one cycle in either direction. Such apparatus can develop relatively high torque and as such, is ideally suited for use in direct writing recording devices where high torque is needed for proper operation of the recording pen.

However, as intimated by Rich in his aforesaid patent, it has been found that such apparatus is subject to a large voltage error when attempts are made to measure frequency in a circuit in which the variations in frequency are expected to be much more than one cycle in either direction. For example, in one such apparatus constructed to measure frequency in the range of 55 to 65 cycles, it was found that the indicated output of the apparatus differed by about one and one-half cycles at 55 cycles and differed by about two cycles at 65 cycles when the voltage applied to the apparatus varied slightly more than 20 volts.

Since such a voltage variation is not unusual in most of the circuits for which such apparatus is intended, it became obvious that the voltage error was much too large to permit use of the apparatus.

An attempt has been made to reduce the voltage error by connecting an inexpensive commercially available voltage stabilizing device between the frequency measuring apparatus and the circuit to be measured, but such attempt met with no success for it was found that the output voltage of the stabilizer changed materially with changes in frequency, and gave rise to an even greater error than when the voltage stabilizer was not used. In additon, the deflection characteristic became quite nonlinear, particularly in the region of maximum deflection at both ends of the scale. Moreover, the addition of frequency compensating networks to the voltage stabilizer or the use of a precision frequency-compensated voltage regulator device in place of a compensated stabilizer was found to add so much to the cost, size and complexity of the overall frequency measuring apparatus as to make the apparatus totally impractical for use in most applications.

In addition to the aforesaid difficulties, it was also found that any substantial change in ambient temperature affected the resistance of the armature and field windings enough to introduce errors that exceeded permissible tolerances.

Therefore, it is a primary object of this invention to provide improved frequency measuring apparatus of the class described, wherein the deflection characteristic of the apparatus is linear over the range in frequency to be measured and the deflection characteristic is substantially unaffected by changes in voltage in the circuit being measured.

It is another object of this invention to provide simple, inexpensive, and effective means to eliminate the voltage error in frequency measuring apparatus of the class described.

It is a still further object of this invention to provide simple and reliable ambient temperature compensating means in frequency measuring apparatus of the class described.

Briefly, in one aspect thereof, the invention comprises the use of a conventional voltage stabilizing device in combination with a modified frequency measuring device of the class described. At any given frequency, the output voltage of the stabilizer is constant, but for the entire range in frequency to be measured, the output voltage will vary over the range and will have a predetermined non-linear characteristic in its variation.

The frequency measuring apparatus has been modified by the inclusion of a fixed resistor in series with the tuned circuit responding to frequencies above 60 cycles, and it has been found that this resistor gives the deflection mechanism a non-linear characteristic in the proper sense to completely compensate for the voltage error, resulting in a linear deflection characteristic of the armature throughout the entire range in frequency to be measured.

In addition, ambient temperature compensation has been provided for by the inclusion of a temperature sensitive resistor in series with the armature winding. Moreover, the addition of the temperature compensating resistor does not in any way disturb the compensating action of the fixed resistor added to the tuned circuit.

Thus, voltage error compensation has been achieved with the use of one resistor properly located in the circuit and ambient temperature compensation may be achieved with another resistor having the proper temperature characteristics.

Figure 1:
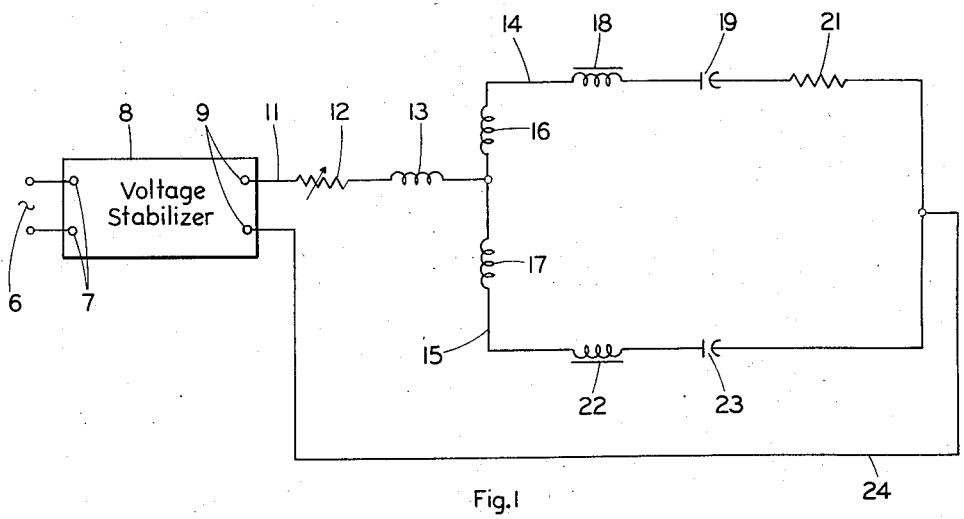
Figure 2:
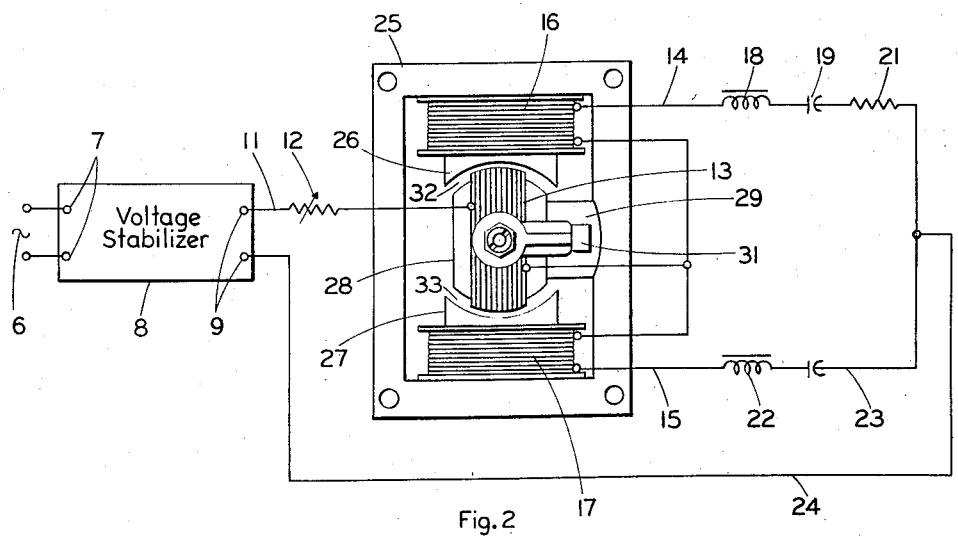
Figure 3:
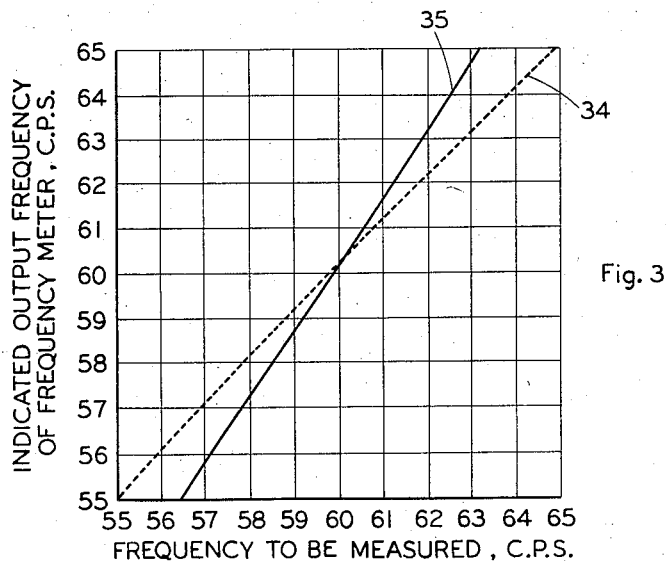
Figure 5:
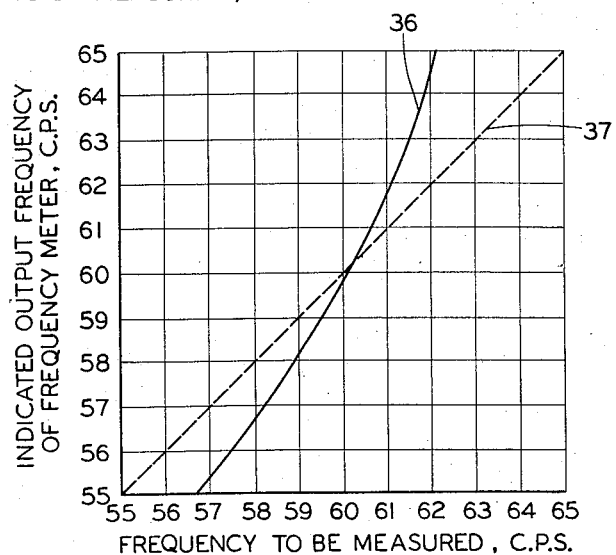

The objects of the invention, together with the benefits and advantages derived therefrom, will be more readily understood upon reference to the following description, particularly when taken in conjunction with the drawings, in which:

Figure 1 is an electrical schematic diagram of the novel circuit forming the present invention, and Figure 2 is the circuit diagram shown in Figure 1 but with the windings of the frequency measuring apparatus shown in their physical form, and Figure 3 is a graph illustrating the voltage error in an uncompensated frequency measuring device, and Figure 4 is a graph illustrating the characteristic of the output voltage of the voltage stabilizer shown in Figures 1 and 2, and Figure 5 is a graph illustrating the output indication of the frequency measuring apparatus shown in Figures 1 and 2, both with and without the novel compensating resistor.

Referring first to Figure 1, there is shown a source of alternating current 6, the frequency of which is to be measured. The normal frequency of this source is intended to be 60 cycles per second, and it is expected that any variations from the normal magnitude will not exceed 5 cycles per second in either direction.

In order to measure the frequency of the source 6 within the limits of the expected variations from normal, the source is connected by suitable leads to the input terminals 7 of a commercially available voltage stabilizer 8 which has the output terminals 9 across which the frequency measuring apparatus may be connected.

The voltage stabilizer 8 at any given frequency will provide across its output terminals 9 a voltage that is constant in magnitude and substantially independent of the magnitude of the voltage at the input terminal 7. However, the nature of the voltage stabilizer is such that any changes in frequency of the applied voltage will affect the magnitude of the output voltage appearing across terminals 9 and this characteristic of the voltage stabilizer is clearly shown in Figure 4. Thus, it is seen in Figure 4 that with a constant voltage of 120 volts applied to the input terminals 7, the output voltage across terminals 9 varied from 105 volts at a frequency of 55 cycles per second to a voltage in excess of 140 volts at a frequency of 65 cycles per second.

This characteristic of the voltage stabilizer has a very material effect on the frequency measuring apparatus intended to be used therewith, as will be set forth in more detail later on in the specification.

Returning now to Figure 1, it is seen that one of the terminals 9 has a lead 11 connected thereto which has in series therewith a temperature sensitive resistor 12, and an armature winding 13. The armature winding 13 forms, as the name implies, a deflecting element of a frequency measuring device which operates on the well known parallel tune circuit principle. Thus, the lead 11 terminates at the junction of the first and second parallel tuned circuits 14, 15, both of which include respectively first and second field windings 16, 17.

As the name implies, the field windings 16, 17 form the stationary flux producing elements of the frequency measuring apparatus and in combination with the current carrying armature winding 13 produces the necessary deflection utilized to give an indication of the frequency being measured.

Included in the first tuned circuit 14 is an inductance 18, a condenser 19, and a fixed compensating resistor 21. In the tuned circuit 15, there is only an inductance 22 and a condenser 23. The other junction of the parallel tuned circuits is connected by a suitable lead 24 to the remaining terminal 9 of the voltage stabilizer.

Referring to Figure 2, the physical arrangement of the windings shown schematically in Figure 1 is generally indicated and it is seen that a rectangular magnetic core 25 has a pair of inwardly projecting pole pieces 26, 27 which terminate in arcuate extremities between which is a core member 28 suitably affixed to the member 25 by the connecting member 29. Pole pieces 26, 27 carry the windings 16, 17, and any fluxes produced in the pole pieces upon energization of the windings pass through the central core member 28 and through the opposite pole pieces and around the outer legs of the rectangular member 25 in their return path. A pedestal 31 is also affixed to member 25 and serves as a bearing member for a shaft on which the armature winding 13 is mounted.

The core 28 has its opposite sides shaped to conform with the arcuate extremities of the pole pieces 26, 27 and forms therewith an air gap 32, 33, within which the armature winding 13 is adapted to move. The windings 16, 17 produce fluxes across these gaps and since the armature winding is carrying current, the interaction of the fluxes with the current produces a torque which deflects the armature.

The deflecting mechanism shown in Figure 2 is similar to a voltage measuring deflecting mechanism disclosed fully in the co-pending application of Harry E. Albright, entitled, "Recording Apparatus," filed December 8, 1955, Serial No. 551,769, and assigned to the same assignee as to which the subject application is assigned. Since the specific details of the deflecting mechanism form no part of the subject invention, further detailed description thereof has been omitted in the interests of brevity and clarity. It is believed that the generally schematic arrangement is adequate to illustrate the principle of the invention in that it is only necessary to show the relative arrangement and relationship of the armature and field windings that are utilized to produce a deflection. Although the specific mechanism shown is intended to be used as a component for a recorder, and thus would have a suitable pen coupled to the shaft on which the armature winding 13 is mounted, such a device could also be used as an indicator providing the recording pen were replaced by a suitable pointer cooperating with a suitable scale.

In either event, whether the frequency measuring apparatus be used as a part of a recording or indicating device, the scale associated therewith will have the 60 cycle point at the mid-point thereof, with the 55 cycle point to one side of the scale and the 65 cycle point to the other. A conventional control spring will be affixed to the armature winding shaft to maintain the 60 cycle position of the armature.

As is pointed out in the aforesaid Rich patent, the tuned circuits 14, 15 are tuned respectively to frequencies above and below 60 cycles. The windings 16, 17 are arranged on the magnetic core 25 such that their polarities are opposite and the constants of the circuits are selected to derive equal currents at 60 cycles with higher currents in the circuit 14 at frequencies above 60 cycles and higher currents in circuit 15 at frequencies below 60 cycles.

Thus, at 60 cycles the currents in the circuits being equal, the fluxes produced by the windings 16, 17 will also be equal and opposite, and there will be no net torque on the armature winding 13. The control spring heretofore referred to will thus position the armature shaft at the 60 cycle point. As the frequency changes above and below 60 cycles, one or the other of the windings 16, 17 will have the predominating effect on the winding 13 and will deflect it against the bias of the control spring and in the proper direction in accordance with the magnitude of the frequency being measured.

If the voltage applied to the tuned circuits were constant at all times during the measurement of the entire range of frequency, the deflection of the armature 13 would be linear throughout the range and there would be no voltage error in the apparatus.

However, it has been found that the voltages in the usual commercial circuits for which the device is intended to be used vary considerably over the normal rated value and this variation in voltage produces a very substantial voltage error which renders the frequency measuring apparatus useless as an accurate measuring tool.

For example, and upon reference to Figure 3, and in the absence of the voltage stabilizer 8 and the resistor 21 shown in Figure 1, the effects of a change in voltage are immediately apparent. Thus, the dotted line 34 in Figure 3 shows the relationship between the indicated output frequency and the frequency to be measured as the latter quantity changes from 55 to 65 cycles per second under a constant input voltage of approximately 97 volts. A reasonably linear characteristic is obtained at this voltage but when the voltage is raised to 120 volts the characteristic changes and is shown by the solid line 35. It is immediately obvious that for the change in voltage of a little more than 20 volts, the indicated output of the frequency meter changes by as much as 1½ cycles per second at the low frequencies and 2 cycles per second at high frequencies.

In an effort to compensate for the effect of changes in voltage on the frequency measuring apparatus, the voltage stabilizer 8 was interposed between the frequency measuring apparatus and the circuit to be measured, but such stabilizers were found to have an undesirable non-linear output voltage characteristic, as hereinbefore discussed in connection with Figure 4, which materially changed as the frequency to be measured changed through the range of 55 to 65 cycles.

Figure 5 shows the indicated output as opposed to the input frequency of the frequency measuring apparatus shown in Figure 1 with and without the compensating resistor 21, the solid line 36 showing the undesirable characteristic response of the meter without the resistor, and the dotted line 37 showing the desirable compensated characteristic with the resistor 21 added to the circuit.

It is interesting to note that the voltage error with the use of the stabilizer is even greater than without it as the indicated frequency was off nearly 2 cycles at the low frequencies and approximately 3 cycles at the high frequencies. Moreover, as is shown by curve 36, the scales at the extreme ends would be quite crowded and extremely non-linear.

In order to avoid the undesirable expense, complexity, and increase in size necessarily resulting from the addition of complicated compensating networks for the voltage stabilizer or the replacement of the voltage stabilizer with a precision frequency-compensated voltage regulating device, either one of which arrangements would be impractical for most applications of the frequency meter, the resistor 21 was added to the tuned circuit 14 and found to produce complete compensation of the frequency meter, yielding the linear deflection characteristic over the entire range of frequencies to be measured under widely varying magnitudes of source voltage, such characteristic being shown by the dotted line 37 in Figure 5. In effect, the addition of resistor 21 imparts a non-linear response to the deflecting mechanism, in the proper sense to completely compensate for the voltage error.

Since the frequency measuring apparatus is normally subjected to a rather substantial change in ambient temperature, it has been found that the resistance of the windings 13, 16, 17 changes sufficiently to materially affect the calibration of the device. To compensate for this temperature effect, the temperature responsive resistor 12 was added in series with winding 13 and in the embodiment illustrated comprises a well known thermistor, that is, a resistance having a negative temperature coefficient of resistance. Since the windings have a positive temperature coefficient of resistance, it is seen that the effect of temperature change will be cancelled out by the provision of the resistor 12.

In one commercial form of the invention, it was found that the following constants would yield the desired linear deflection characteristic. The armature winding consisted of 400 turns of copper wire having a resistance of 58 ohms and each of the field windings consisted of 1000 turns of copper wire having a resistance per winding of 47 ohms. The inductance of the armature winding and either of the field windings at mid-scale position was 0.41 henry.

The inductances 18, 22 had values of 1.3 and 6.0 henries respectively and the condensers 19, 23 both had a capacitance of two micro-farads.

A suitable value of resistance for the resistor 21 was found to be approximately 380 ohms and the temperature responsive resistor 12 had a resistance of 303 ohms at 25° C.; although not shown in the drawings, the resistor 12 may be higher in value and shunted with a suitable fixed resistor.

The voltage stabilizer was of the type rated for 115 volts output at 60 cycles, with inputs varying from 95 to 130 volts.

Of course, it is to be recognized that other values of resistance for both the resistor 21 and the resistor 12 will be selected for proper compensation in accordance with any changes in other constants of the circuit.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. Frequency measuring apparatus for a source of alternating current whose voltage is substantially constant in magnitude at any given frequency but whose voltage varies in magnitude in a non-linear manner with changes in the frequency to be measured comprising first and second current carrying parallel tuned circuits, said circuits being respectively tuned for first and second frequencies which differ in magnitude and which are respectively above and below the average frequency to be measured, means responsive to the relationship between the currents carried by said first and second circuits including a deflecting member, said deflecting member having a linear deflection characteristic throughout the range in frequency to be measured when the magnitude of the voltage applied to said first and second circuits is constant, and means to compensate for any changes in magnitude of said voltage resulting from frequency whereby said deflecting member retains said linear deflection characteristic comprising a resistor inserted in series with said first circuit.

2. Frequency measuring apparatus for a source of alternating current whose voltage is substantailly constant in magnitude at any given frequency but whose voltage varies in magnitude in a non-linear manner with changes in the frequency to be measured comprising first and second current carrying parallel tuned circuits, said circuits being respectively tuned for first and second frequencies which differ in magnitude and which are respectively above and below the average frequency to be measured, means responsive to the relationship between the currents carried by said first and second circuits including a deflecting member, said deflecting member assuming the mid-position in its path of travel when said average frequency is being measured and moving away from said mid-position in opposite directions when the frequency being measured is above or below said average frequency, the deflection characteristic of said deflecting member being linear throughout the range in frequency to be measured when the magnitude of the voltage applied to said first and second circuits is constant, and means to compensate for any changes in magnitude of said voltage resulting from changes in frequency whereby said deflecting member retains said linear deflection characteristic comprising a resistor inserted in series with said first circuit.

3. Frequency measuring apparatus for a source of alternating current whose voltage is substantially constant in magnitude at any given frequency but whose voltage varies in magnitude in a non-linear manner with changes in the frequency to be measured comprising first and second current carrying parallel tuned circuits, said circuits including first and second field windings respectively and being respectively tuned for first and second frequencies which differ in magnitude and which are respectively above and below the average frequency to be measured, means responsive to the relationship between the currents carried by said first and second circuits including said field windings and an armature winding connected in series with said parallel circuits, said armature and field windings being mounted for relative motion and said last-named means also including a deflecting member moving in response to said relative motion, said deflecting member assuming the mid-position in its path of travel when said average frequency is being measured and moving away from said mid-position in opposite directions when the frequency being measured is above or below said average frequency, the deflection characteristic of said deflecting member being linear throughout the range in frequency to be measured when the magnitude of the voltage applied to said tuned circuits is constant, and means to compensate for any changes in magnitude of said voltage resulting from changes in frequency whereby said deflecting member retains said linear deflection characteristic comprising a resistor inserted in series with said first circuit.

4. Frequency measuring apparatus for a source of alternating current whose voltage is substantially constant in magnitude at any given frequency but whose voltage varies in magnitude in a non-linear manner with changes in the frequency to be measured comprising first and second current carrying parallel tuned circuits, said circuits including first and second field windings respectively and being respectively tuned for first and second frequencies which differ in magnitude and which are respectively above and below the average frequency to be measured, means responsive to the relationship between the currents carried by said tuned circuits including said field windings and an armature winding connected in series with said parallel circuits, said armature and field windings being mounted for relative motion and said last-named means also including a deflecting member moving in response to said relative motion, the deflection characteristic of said deflecting member being linear throughout the range in frequency to be measured when the magnitude of the voltage applied to said tuned circuits is constant, means to compensate for any changes in magnitude of said voltage resulting from changes in frequency whereby said deflecting member retains said linear deflection characteristic comprising a resistor inserted in series with said first circuit, and means to compensate for any changes in resistance of said field and armature windings resulting from changes in ambient temperature comprising temperature responsive resistance means connected in series with said armature winding.

5. Frequency measuring apparatus comprising first and second current carrying parallel tuned circuits, said circuits being respectively tuned for first and second frequencies which differ in magnitude and which are respectively above and below the average frequency to be measured, means including voltage stabilizing means for connecting said first and second circuits to the circuit whose frequency is to be measured, said voltage stabilizing means having input terminals adapted to be connected to said circuit to be measured and having output terminals adapted to be connected to said first and second circuits, the voltage across said output terminals having a substantially constant magnitude at any given frequency but having a magnitude that changes as a function of the frequency to be measured, means responsive to the relationship between the currents carried by said first and second circuits including a deflecting member, and means to compensate for changes in said voltage comprising a resistor inserted in series with said first circuit whereby said deflecting member has a linear deflection characteristic throughout the range in frequency to be measured.

6. Frequency measuring apparatus comprising first and second current carrying parallel tuned circuits, said circuits being respectively tuned for first and second frequencies which differ in magnitude and which are respectively above and below the average frequency to be measured, means including voltage stabilizing means for connecting said first and second circuits to the circuit whose frequency is to be measured, said voltage stabilizing means having input terminals adapted to be connected to said circuit to be measured and having output terminals adapted to be connected to said first and second circuits, the magnitude of the voltage across said output terminals being substantially independent of any changes in magnitude of the voltage across said input terminals but changing as a function of the frequency to be measured, means responsive to the relationship between the currents carried by said first and second circuits including a deflecting member, said deflecting member assuming the mid-position in its path of travel when said average frequency is being measured and moving away from said mid-position in opposite directions when the frequency being measured is above or below said average frequency, the deflection characteristic of said deflecting member being linear throughout the range in frequency to be measured when the magnitude of the voltage across said output terminals is substantially constant, and means to compensate for changes in said voltage comprising a resistor inserted in series with said first circuit whereby said deflecting member has a linear deflection characteristic throughout the range in frequency to be measured.

References Cited in the file of this patent

UNITED STATES PATENTS

| | | |
|---|---|---|
| 1,564,933 | Brown | Dec. 8, 1925 |
| 1,763,175 | Nutzelburger | June 10, 1930 |
| 1,947,187 | Clark | Feb. 13, 1934 |
| 2,087,652 | Oakley | July 20, 1937 |

FOREIGN PATENTS

| | | |
|---|---|---|
| 575,594 | Great Britain | Feb. 25, 1946 |
| 727,434 | Great Britain | Mar. 30, 1955 |